(12) United States Patent
Dubé

(10) Patent No.: US 9,424,887 B1
(45) Date of Patent: Aug. 23, 2016

(54) APPARATUS WITH VAPOR-TRAPPING PATHWAY

(71) Applicant: Seagate Technology LLC, Cupertino, CA (US)

(72) Inventor: Mark Dubé, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/693,726

(22) Filed: Apr. 22, 2015

(51) Int. Cl.
*G11B 5/48* (2006.01)
*G11B 33/14* (2006.01)

(52) U.S. Cl.
CPC .............. *G11B 33/146* (2013.01); *G11B 5/48* (2013.01)

(58) Field of Classification Search
CPC ............ G11B 19/20; G11B 5/48; G11B 5/55
USPC .................................... 360/265–265.9, 99.08
See application file for complete search history.

(56) References Cited

U.S. PATENT DOCUMENTS

| 5,482,381 | A | 1/1996 | Krum et al. |
|---|---|---|---|
| 6,371,654 | B1 | 4/2002 | Misso |
| 7,072,148 | B2 | 7/2006 | Tsuchiya |
| 7,341,379 | B2 | 3/2008 | Koyama |
| 8,284,523 | B2 | 10/2012 | Schmidt et al. |
| 8,902,543 | B1 * | 12/2014 | Wang .................. G11B 33/1473 360/99.08 |
| 2004/0120079 | A1 * | 6/2004 | Tsuchiya ................. F16C 19/54 360/265.2 |
| 2006/0139813 | A1 * | 6/2006 | Hayakawa ........... G11B 5/5526 360/265.2 |
| 2011/0188796 | A1 * | 8/2011 | Tsuchiya ................. F16C 33/80 384/607 |
| 2015/0055250 | A1 * | 2/2015 | Tsuchiya ............. G11B 5/5569 360/234.1 |

\* cited by examiner

*Primary Examiner* — Allen T Cao
(74) *Attorney, Agent, or Firm* — Crawford Maunu PLLC

(57) ABSTRACT

Various aspects of the present disclosure are directed toward a disc drive apparatus including a disc drive actuator assembly, and a vapor-trapping pathway. The vapor-trapping pathway, in certain embodiments, is formed by an inner surface of an eblock, outer surface of a pivot shaft, and first and second shields. The vapor-trapping pathway being designed to mitigate the flow of vapor into an interior enclosure of the disc drive from within a ball-bearing cartridge.

17 Claims, 3 Drawing Sheets

SECTION A-A

SECTION A-A

APPARATUS WITH VAPOR-TRAPPING PATHWAY

BACKGROUND

Disc drives are used for data storage in modern electronic products ranging from audio players to computer systems and networks. A disc drive typically includes a mechanical portion, or head disc assembly (HDA), and electronics in the form of a printed circuit board assembly (PCBA), mounted to an outer surface of the HDA. The PCBA controls HDA functions and provides an interface between the disc drive and its host. An HDA includes moving parts such as one or more magnetic discs affixed to a spindle motor assembly for rotation at a constant speed, an actuator assembly supporting an array of read/write heads that traverse generally concentric data tracks radially spaced across the disc surfaces, and a voice coil motor (VCM) providing rotational motion to the actuator assembly. In operation, the magnetic-recording disc rapidly rotates by the spindle motor to access (read and/or write) the data stored on the disc.

SUMMARY

Various example embodiments are directed to apparatuses and/or methods that mitigate the escape of vapor and/or evaporated lubricant from a bearing cartridge assembly. One or more of these embodiments may be particularly applicable, for example, to disc drives in which vapor-trapping pathways are implemented to mitigate or prevent the effect of such vapor and/or evaporated lubricant, which may accumulate on a magnetoresistive head or data surface of storage media causing read/write errors, or otherwise affect the performance of the disc drive, while also reducing assembly complexity and part costs. In conjunction with one or more such embodiments, it has been discovered (via computer-aided-modeling) that various embodiments of the vapor-trapping pathway of the present disclosure can reduce vapor and/or evaporated lubricant escaping from the bearing cartridge assembly by as much as 400% (or more), thereby greatly extending the functional life of the disc drive.

According to various example embodiments, aspects of the present disclosure are directed toward a disc drive apparatus including a base with a pivot shaft, a disc drive actuator assembly with an eblock, and a vapor-trapping pathway between the eblock and the pivot shaft. In some embodiments, the disc drive actuator assembly further includes a plurality of bearings designed to facilitate rotation of the eblock around the pivot shaft. The pivot shaft is fixed relative to the base, and the eblock has an inner surface facing an outward surface of the pivot bearing. In more specific embodiments, the vapor-trapping pathway includes a trap region that is defined, in part, by a plurality of ball-bearing cartridges, the vapor-trapping pathway being designed to pass vapor flow outwardly, relative to the pivot shaft, to condense along the inner surface of the eblock, and to recede from a level above the ball-bearing cartridges in to the trap region due to gravitational forces.

In one embodiment of the present disclosure, an apparatus is disclosed including: a shaft, bearing cartridge, eblock, and first and second shields. The shaft having proximal and distal ends, and an outer surface extending between the proximal and distal ends along a circumference of the shaft. The bearing cartridge including an inner ring interfacing with an outer surface of the shaft, an outer ring that is concentric with the inner ring (the outer ring rotating about the shaft independently from the inner ring), and a plurality of ball bearings and lubricant between the inner ring and the outer ring. The outer ring and the inner ring of the bearing cartridge contain the ball bearings and lubricant there between. An eblock is positioned around the outer ring and has an inner surface coupled to the outer ring. The eblock rotates with the outer ring about the shaft. The first shield extends from the outer surface of the shaft toward the inner surface of the eblock. Another, second, shield is coupled to and extends from the inner surface of the eblock toward the outer surface of the shaft, the second shield and the first shield (in combination) restrict flow of vapor out of a trap region between the shaft and the eblock.

Certain embodiments of the present disclosure are directed toward a method for lessening outflow of vapor in a disc drive apparatus having a base and a disc drive actuator assembly. The disc drive actuator assembly includes an eblock and a pivot shaft which form a vapor-trapping pathway.

Various aspects of the present disclosure are directed toward methods. In one such method, a vapor-trapping pathway is provided between a pivot shaft and an eblock of a disc drive apparatus. The vapor-trapping pathway is defined by an outer surface of the pivot shaft, an inner surface of the eblock, a first shield extending from the outer surface of the shaft toward the inner surface of the eblock, and a second shield coupled to and extending from the inner surface of the eblock toward the outer surface of the shaft. The disc drive apparatus is operated causing the eblock to rotate around the pivot shaft, via a plurality of bearings. During operation of the disc drive apparatus, vapor is trapped in the vapor-trapping pathway by passing vapor flow outwardly, relative to the pivot shaft.

Consistent with the above, various methods of the present disclosure can include the steps of providing a vapor-trapping pathway between a pivot shaft and the eblock, operating the disc drive apparatus, and trapping vapor in the vapor-trapping pathway. The vapor-trapping pathway is defined by the interface of the pivot shaft, the eblock, and a first and second shield. In various embodiments, the disc drive apparatus is then operated by causing the eblock to rotate around the pivot shaft, via a plurality of bearings. The vapor trapping pathway traps vapor along an inner surface of the eblock (among other surfaces of the vapor-trapping pathway) due to centrifugal force caused by the movement of the eblock. Upon contact with the various surfaces of the vapor-trapping pathway, the vapor cools and condenses along the surfaces, and gravity then pulls the condensed vapor into a trap region defined in part by the plurality of bearings.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

Figure 1A:
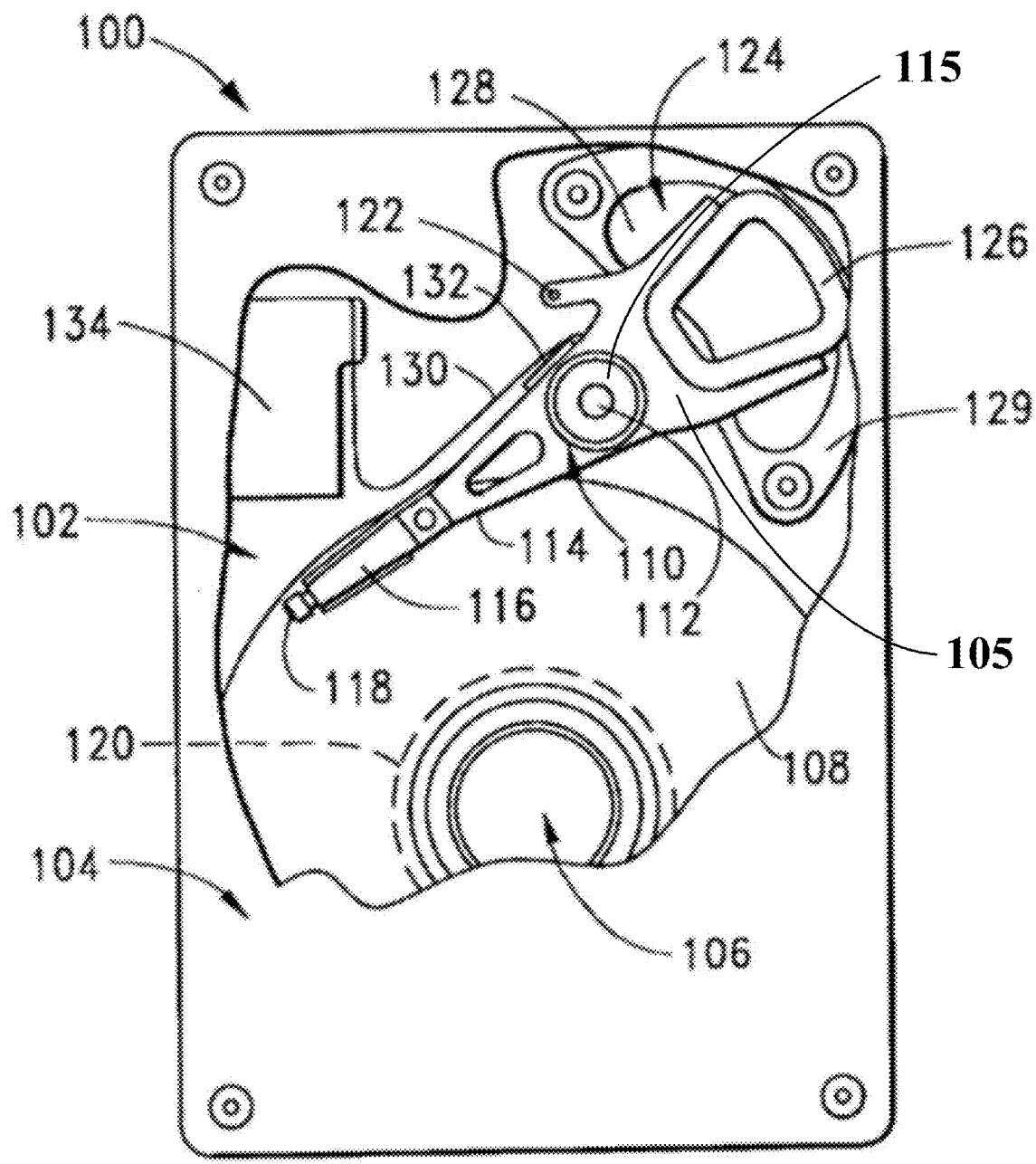
FIG. 1A is a top view of a disc drive, consistent with various aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements, including those involving long-term use of enclosed storage devices. Specific embodiments of the present disclosure are believed to be particularly beneficial to a disc drive apparatus including complex moving/mechanisms such as pivot bearings, spindle motors, and HDAs as described above. While the present disclosure is not necessarily so limited, various aspects of the disclosure may be appreciated through a discussion of examples using this context. Various example embodiments are directed to the reduction of grease/lubricant vapor outgassing from an eblock in a disc drive actuator assembly and its implementation.

Various embodiments of the present disclosure are directed to a disc drive unit including an actuator assembly, as mentioned above. The actuator assembly includes an eblock that pivots about a pivot shaft by way of a cartridge bearing assembly. The cartridge bearing assembly contains bearings between inner and outer races and further packed with lubricant to minimize resistance between the bearing and races. The present embodiment mitigates the amount of outgassing (e.g., vaporized particles of lubricant/grease from within the cartridge bearing assembly caused by excess heat generated by the friction between the bearing and races) that enters the interior enclosure of the disc drive. This can be desirable as the vapor may affect the performance and reliability of the head/disc interface (HDI), which is an important part of the disc drive recording system. For example, this approach can mitigate issues with small particles interfering with the HDI, which can result in problems that require service/repair of the drive.

Various aspects of the present disclosure are directed toward an apparatus including a base, a disc drive actuator assembly and a vapor-trapping pathway. The disc drive actuator assembly includes a pivot shaft, an eblock and a plurality of bearings. The plurality of bearings are designed to facilitate rotation of the eblock around the pivot shaft. The pivot shaft is fixed relative to the base. In some embodiments, the vapor-trapping pathway includes an outer surface of the pivot shaft, outer surface of the eblock and first and second shields.

The vapor-trapping pathway of the present disclosure can be used in conjunction with a labyrinth seal on a bearing-cartridge assembly to prevent the outgassing of lubricant, such as grease, and lubricant vapor (vapor). The vapor-trapping pathway limits the amount of vapor outgassing into an interior enclosure of a disc drive apparatus. Within the interior enclosure of the disc drive apparatus, such vapor can damage moving components of the disc drive apparatus which in some cases may ultimately lead to failure of the disc drive.

Various example embodiments include first and second shields that extend between an outer surface of a pivot shaft and an inner surface of an eblock forming a vapor-trapping pathway. The vapor-trapping pathway provides restriction of atmospheric flow through the bearing cartridge assembly by creating several turns which limit atmospheric and vapor flow, and provide increased surface area on which the vapor particles may condense. The turns (e.g., 90 degree flow-impeding walls) also slow down the velocity of the vapor increasing the amount of vapor that may be captured by the vapor-trapping pathway, and accordingly escape of vapor into the interior enclosure of the disc drive is mitigated.

In connection with one or more embodiments, it has been discovered/recognized that vapor-trapping pathways and related methods as presented in this present disclosure can achieve surprisingly good results with respect to mitigation of vapor flow. For instance, in various embodiments one or more vapor-trapping pathways as characterized herein can be used to reduce outgassing by over seven times (e.g., relative to devices such as those characterized in the background).

In one embodiment of the present disclosure, an apparatus is disclosed including: a shaft, bearing cartridge, eblock, and first and second shields. The shaft having proximal and distal ends, and an outer surface extending between the proximal and distal ends along a circumference of the shaft. The bearing cartridge including an inner ring interfacing with an outer surface of the shaft, an outer ring that is concentric with the inner ring (the outer ring rotating about the shaft independently from the inner ring), and a plurality of ball bearings and lubricant between the inner ring and the outer ring. The outer ring and the inner ring of the bearing cartridge contain the ball bearings and lubricant there between. An eblock is positioned around the outer ring and has an inner surface coupled to the outer ring. The eblock rotates with the outer ring about the shaft. The first shield extends from the outer surface of the shaft toward the inner surface of the eblock. Another, second, shield is coupled to and extends from the inner surface of the eblock toward the outer surface of the shaft, the second shield and the first shield (in combination) restrict flow of vapor out of a trap region between the shaft and the eblock. In various further embodiments, the eblock is directly coupled to the outer surface of the plurality of bearing cartridges.

In some embodiments, the outer surface of the shaft, the inner surface of the eblock and the first and second shields define a vapor-trapping pathway that contains the flow of vapor out of the trap region and condenses vapor along the walls of the vapor-trapping pathway. In more specific embodiments, the vapor-trapping pathway passes condensed vapor into the trap region. Several experimental embodiments limit the vapor-trapping pathway to less than 0.020 inches wide.

Many embodiments are directed to the first shield and eblock defining a gap which permits the first shield as coupled to the outer surface of the shaft to rotate relative to the eblock. In such embodiments, the first shield extends outward towards the inner surface of the eblock and impedes the flow of vapor or lubricant from the trap region. In further embodiments, the shaft and second shield define another gap which permits the second shield as coupled to the inner surface of the eblock to rotate relative to the shaft. In this embodiment, the second shield extends inwards towards the outer surface of the shaft and further impedes the flow of vapor or lubricant from the trap region. In some embodiments, a top surface of the first shield condenses and collects vapor in response to gravitational forces acting on the vapor. In more specific embodiments, the gap between the first shield and the eblock is less than 0.010 inches, and the other gap between the second shield and the shaft is less than 0.010 inches.

Embodiments of the present disclosure disclose an elongated pathway defined by the outer surface of the shaft, the inner surface of the eblock and the first and second shields, which restrict a majority of the vapor flow from the trap region.

Several embodiments of the present disclosure are directed to disc drive apparatuses including an eblock which supports a plurality of magnetoresistive elements for accessing (reading and writing) magnetically stored data on rotating media (storage media).

In many of the proposed embodiments, the inner surface of the eblock condenses vapor (utilizing centrifugal force created by a rotation of the eblock) by forcing the vapor into contact with the inner surface of the eblock. The condensed vapor on the inner surface accumulates in the trap region due to a gravitational force acting on the condensed vapor.

Certain embodiments of the present disclosure are characterized by a vapor-trapping pathway that passes vapor into the trap region at which condensation of the vapor is facilitated. Such facilitation may include reduced velocity of the vapor, increased surface area in a cross-sectional area of the vapor-trapping pathway, also utilizing existing forces within the disc drive apparatus to increase contact of the vapor with the surfaces of the vapor-trapping pathway.

In one type of embodiment, the eblock and the pivot shaft are separated from one another by an air gap that defines the vapor-trapping pathway. Such an air gap between the eblock and pivot shaft may be useful to allow for clearance of the eblock rotation about the pivot axis of the pivot shaft. This clearance is facilitated while using vapor-trapping characteristics, as this air gap may otherwise provide a path of vapor escape into the interior enclosure of the disc drive apparatus.

In other embodiments, the vapor-trapping pathway is designed to restrict a flow of vapor out of, and a flow of air into and out of, the disc drive actuator assembly. Restricting inflow of air in the disc drive actuator assembly in this context can mitigate issues with grease/lubricant within the bearing-cartridge assembly vaporizing and escaping into the interior enclosure of the disc drive apparatus.

Various approaches may be implemented for lessening the outflow of vapor in a disc drive apparatus. In some embodiments, a vapor-trapping pathway is provided between a pivot shaft and an eblock, a corresponding disc drive apparatus is operated and vapor is trapped in the vapor-trapping pathway. The vapor-trapping pathway is defined by the interface of the pivot shaft, the eblock, and a first and second shield. The disc drive apparatus operates by causing the eblock to rotate around the pivot shaft, via a plurality of bearings. The vapor-trapping pathway traps vapor that escapes a trap region that is partly defined by a plurality of ball-bearing cartridges. The vapor-trapping pathway is designed to pass vapor flow outwardly (due to centrifugal force), relative to the pivot shaft. The centrifugal force causing the vapor to contact a wall of the vapor-trapping pathway, cool, and condense on one of the surfaces of the vapor-trapping pathway. Gravitational forces on the condensed vapor cause the vapor to recede into the trap region which is located at a level below the vapor-trapping pathway.

Various aspects of the present disclosure are directed toward methods. In one such method, a vapor-trapping pathway is provided between a pivot shaft and an eblock of a disc drive apparatus. The vapor-trapping pathway is defined by an outer surface of the pivot shaft, an inner surface of the eblock, a first shield extending from the outer surface of the shaft toward the inner surface of the eblock, and a second shield coupled to and extending from the inner surface of the eblock toward the outer surface of the shaft. The disc drive apparatus is operated causing the eblock to rotate around the pivot shaft, via a plurality of bearings. During operation of the disc drive apparatus, vapor is trapped in the vapor-trapping pathway by passing vapor flow outwardly, relative to the pivot shaft.

Various aspects of the present disclosure are also further directed towards different aspects of the disc drive apparatuses, as described above, along with related methods of manufacture and uses. For example, these methods include the manufacture of the entire disc drive apparatuses and portions thereof such as the eblock and base.

Turning now to the figures, some of the benefits and issues addressed by the present disclosure will become apparent with a discussion of head-stack assembly components used in an exemplary disc drive apparatus. FIG. 1A shows a disc drive 100 constructed in accordance with an exemplary embodiment of the present disclosure. The disc drive 100 includes a base 102 to which various components of the disc drive 100 are mounted. A top cover 104 (shown in partial cutaway fashion) and the base 102 are coupled together to form a sealed atmospheric environment for the disc drive.

A spindle motor (shown generally at 106) rotates one or more discs 108 at a constant high speed. Information is accessed (written to and/or read) via tracks (not designated) on the discs 108 through the use of an actuator assembly 110 including an eblock 105. The eblock 105 rotates about a pivot shaft 112 using a cartridge bearing assembly (under 115). The eblock 105 is positioned adjacent to the discs 108, allowing the eblock and attached head 118 to pivot and access data across the entirety of the discs 108. The base 102 and eblock 105 and the related vapor-trapping pathway 115, are discussed in greater detail below.

The actuator assembly 110 includes a plurality of actuator arms 114 which extend towards the discs 108, with one or more flexures 116 extending from each of the actuator arms 114. Mounted at the distal end of each of the flexures 116 is a head 118 which includes a slider assembly (not separately designated) designed to enable the head 118 to fly in close proximity to the corresponding surface of the associated disc 108.

The radial position of the heads 118 over the discs 108 is controlled through the use of a VCM 124, which typically includes a coil 126 attached to the actuator assembly 110, as well as one or more permanent magnets 128 and corresponding magnetically permeable pole-pieces 129 which establish a magnetic field in which the coil 126 is immersed. The controlled application of current to the coil 126 causes magnetic interaction between the magnetic field of the VCM 124 and electromagnetic fields induced in the coil 126, so that the coil 126 moves in accordance with the well-known Lorentz relationship. As the coil 126 moves, the actuator assembly 110 pivots about the pivot shaft 112 and the heads 118 are moved across the surfaces of the discs 108. In performance focused disc drive applications, the electrical current of the coil 126 is rapidly changed in order to maximize disc seek velocity and minimize latency between a read/write request to the disc drive and fulfillment of the request. This rapid movement creates friction between bearings, and inner and outer tracks of the cartridge bearing assembly which dissipates as heat therein. It has been discovered that an increase of 10° C. in the cartridge bearing assembly can cause a 2× increase in lubricant vaporization and outgassing into the interior enclosure of the disc drive.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base 102 to a disc drive printed circuit board (not shown) mounted to the bottom side of the disc drive 100.

Figure 1B:
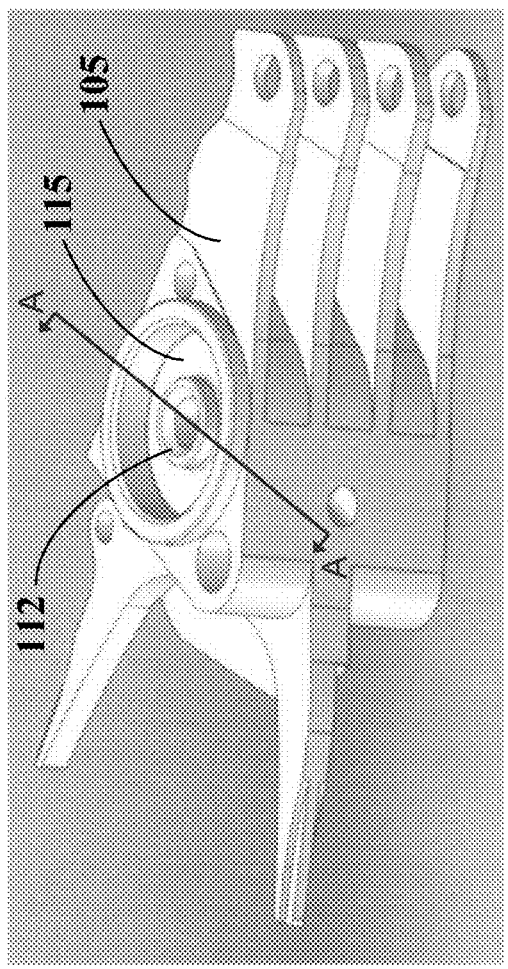
FIG. 1B is a perspective view illustrating an eblock, consistent with various aspects of the present disclosure.

Referring now to FIG. 1B, shown therein is a perspective view of an eblock 105 consistent with an exemplary embodiment of the present disclosure. The eblock 105 in this exemplary figure includes the cartridge-bearing assembly 115 installed in the eblock 105, and located adjacent to a pivot shaft 112. The cartridge-bearing assembly 115 housing a plurality of ball-bearing cartridges and first and second shields for mitigating the outgassing of vapor from the cartridge-bearing assembly 115.

Figure 1C:
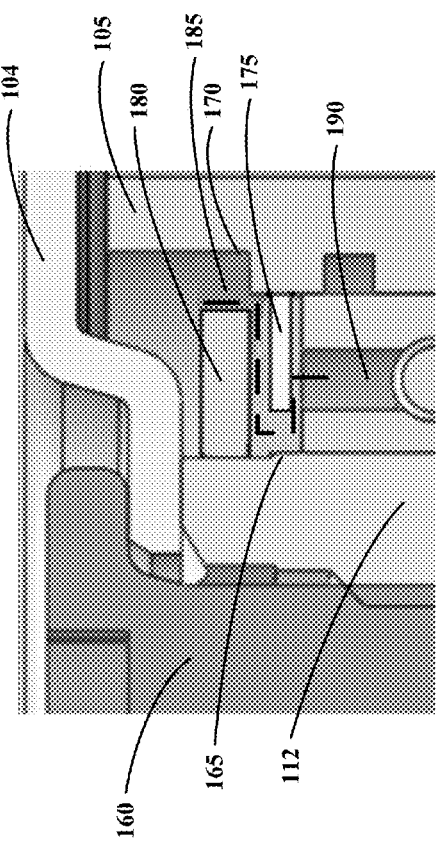
FIG. 1C is a cross-sectional view illustrating the eblock of FIG. 1B, consistent with various aspects of the present disclosure.

Referring now to FIG. 1C, a cross-section A-A of FIG. B, shown therein is a perspective view of a bearing-cartridge assembly (115 in FIG. 1B) within a disc drive apparatus consistent with various exemplary embodiments of the present disclosure. A ball-bearing cartridge 190 couples pivot shaft 112 to eblock 105 while allowing the eblock 105 to rotate independently of the pivot shaft 112. As discussed above, the rotation of the eblock 105 relative to the pivot shaft 112 causes the ball bearings of the ball-bearing cartridge 190 to rotate and dissipate energy in the form of heat. Over extended periods of use, the heat induced in the ball-bearing cartridge 190 causes lubricant therein to vaporize. Such vapor, if allowed to outgas into the hard drive enclosure, can damage moving components of the disc drive apparatus, and in some cases may ultimately lead to failure of the disc drive. Accordingly, in the present embodiment, outgassing of vapor is mitigated via a vapor-trapping pathway 185. The vapor-trapping pathway 185 is formed by an outer surface 165 of the pivot shaft 112, an inner surface 170 of the eblock 105, and first and second shields (175 and 180, respectively). The vapor-trapping pathway 185, among other benefits, controls vapor outgassing from the ball-bearing cartridge 190, facilitates condensation of vapor along the walls of the vapor-trapping pathway 185, and minimizes the inflow of air into the cartridge bearing assembly. For added mechanical stability, the pivot shaft 112 is coupled to top cover 104 using a fastener 160.

Figures 2A, 2B:
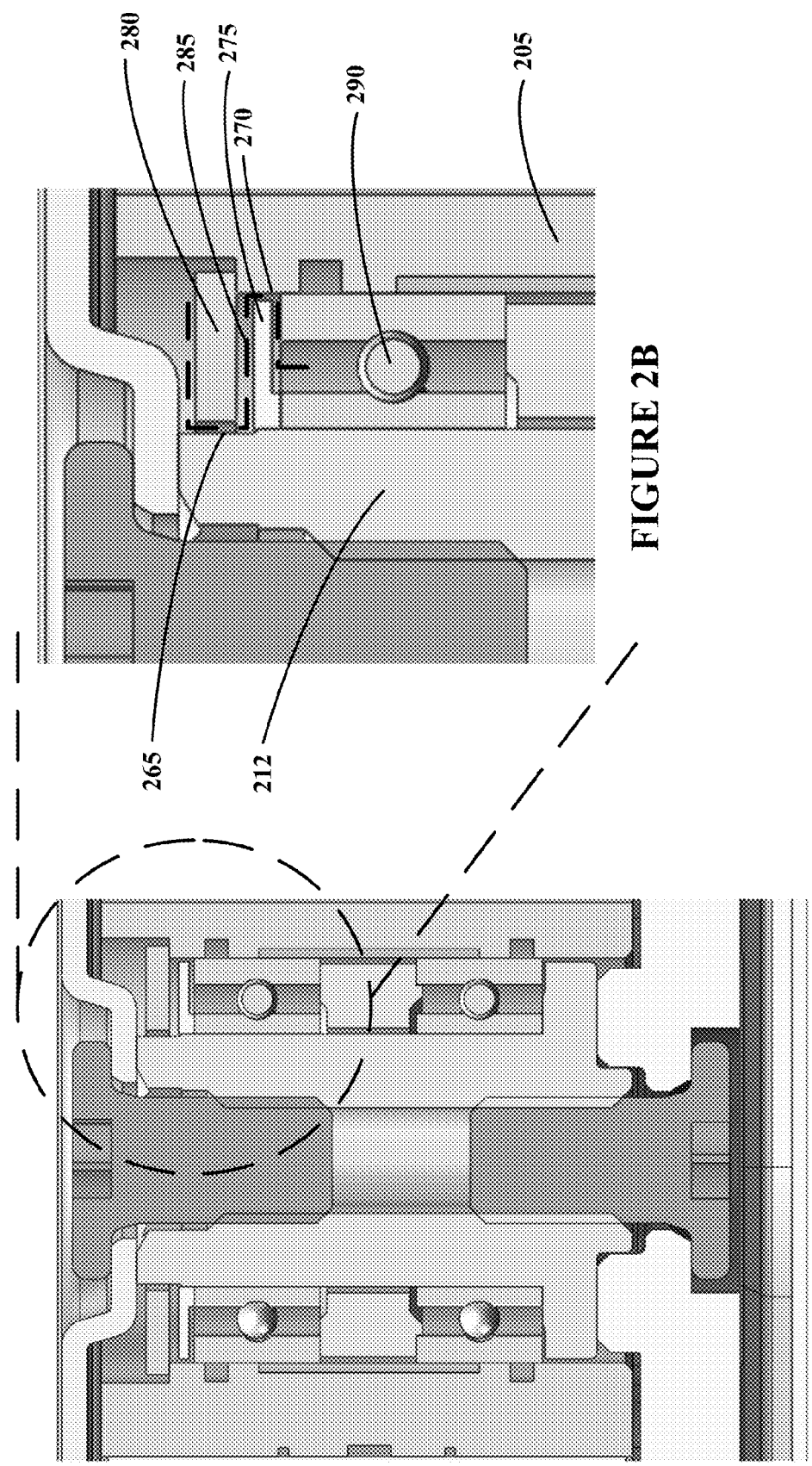
FIG. 2A is a cross-sectional side view of an actuator assembly including a vapor-trapping pathway, consistent with various aspects of the present disclosure.
FIG. 2B is a magnified cross-sectional side view of the actuator assembly of FIG. 2A, consistent with various aspects of the present disclosure.

FIGS. 2A & B illustrate a cross-sectional side view of one embodiment of a vapor-trapping pathway 285, consistent with various aspects of the present disclosure. As shown in FIGS. 2A & B, a ball-bearing cartridge 290 couples pivot shaft 212 to eblock 205 while allowing the eblock 205 to rotate independently of the pivot shaft 212. As discussed above, the rotation of the eblock 205 relative to the pivot shaft 212 causes the ball-bearing cartridge 290 to outgas vapor. Accordingly, in the present embodiment, outgassing of vapor is mitigated via a vapor-trapping pathway 285. The vapor-trapping pathway 285 is formed by an outer surface 265 of the pivot shaft 212, an inner surface 270 of the eblock 205, and first and second shields (275 and 280, respectively). The rotation of the eblock 205 relative to the pivot shaft 212 induces centrifugal forces upon the escaping vapors as the vapors traverse the vapor-trapping pathway 285. The centrifugal forces cause the vapors to contact the various surfaces of the vapor-trapping pathway 285, especially the inner surface 270 of the eblock 205 (due to the centrifugal force exerted thereon). The vapor, upon contact with the surfaces of the vapor-trapping pathway 285 cool and condenses thereon.

Vapor that does not condense along the inner surface 270 of the eblock 205 is then required to travel inward toward the outer surface 265 of the pivot shaft 260. However; this vapor encounters much resistance due to the fact that it is traveling parallel to the centrifugal force. These forces acting on the remaining vapor causes a majority of the remaining vapor to condense or be trapped between the first shield 275 and the second shield 280. Much of the condensed vapor on the walls of the vapor-trapping pathway 285 eventually, due to gravitational threes, collects in the ball-bearing cartridge 290. Accordingly, the vapor-trapping pathway 285 limits the amount of vapor that escapes the cartridge bearing assembly and enters the interior enclosure of the disc drive.

In various embodiments, the vapor-trapping pathway 285 can be implemented to function in several ways to limit the escape of vapors. The vapor-trapping pathway 285 significantly extends the length that the vapor must travel to escape the eblock 205; the extended length increases the amount of vapor that condenses along the walls of the vapor-trapping pathway 285. The length of the vapor-trapping pathway 285 and the angles of the turns of the vapor-trapping pathway 285 further limit such flow of vapor out of the Mock 205. Also, the vapor-trapping pathway 285 limits the flow of air, caused by the rotation of the discs in the interior enclosure of the disc drive, from entering the eblock 205 and aiding in the vaporization of the grease in the cartridge bearing assembly. In turn, this limits the amount of vapor that escapes the eblock 205.

For high speed disc drives, a spindle motor assembly may operate at rotational speeds such as 7,200 rounds-per-minute (rpm), 10,000 rpm, or 15,000 rpm. The high rpm of the discs result in higher temperatures and increased air flow within the disc drive which contributes to bearing outgassing. As discussed above, it has been discovered that an increase of 10° C. in the cartridge bearing assembly can cause a 2× increase in lubricant vaporization and outgassing into the interior enclosure of the disc drive. The actuator assembly also operates at a high rate of speed in order to achieve the input-outputs-per-second (iops) required of a high performance drive. As the cartridge bearing assembly rotates, and in turn the eblock 205, small particles of lubricant/grease in the cartridge bearing assembly can splash and mix with atmosphere to form vapor. As discussed above, such vaporized lubricant/grease has the potential to outgas from the cartridge bearing assembly into the interior enclosure of the disc drive, which is further facilitated by high temperatures and air flow within the disc drive.

Based upon the above discussion and illustrations, those skilled in the art will readily recognize that various modifications and changes may be made to the present disclosure without strictly following the exemplary embodiments and applications illustrated and described herein. For example, a vapor-trapping pathway may contain a plurality of trap regions, or utilize irregular surfaces in the pathway that induces drag and increases surface-area. Such modifications do not depart from the true spirit and scope of the present disclosure, including that set forth in the following claims.

What is claimed is:

1. An apparatus comprising:
   a shaft having proximal and distal ends, and an outer surface extending between the proximal and distal ends along a circumference of the shaft;
   a bearing cartridge including
      an inner ring interfacing with an outer surface of the shaft,
      an outer ring that is concentric with the inner ring and configured and arranged to rotate about the shaft independently from the inner ring, and a plurality of ball bearings and lubricant between the inner ring and the outer ring, the outer ring being configured and arranged with the inner ring to contain the ball bearings and lubricant between the inner ring and the outer ring;

an eblock around the outer ring and having an inner surface coupled to the outer ring, the eblock being configured and arranged to rotate with the outer ring about the shaft;

a first shield extending from the outer surface of the shaft toward the inner surface of the eblock; and a second shield coupled to and extending from the inner surface of the eblock toward the outer surface of the shaft, the second shield being configured and arranged with the first shield to restrict flow of vapor out of a trap region between the shaft and the eblock.

2. The apparatus of claim 1, wherein the eblock is directly coupled to the outer surface of the bearing cartridge.

3. The apparatus of claim 1, wherein the outer surface of the shaft, the inner surface of the eblock and the first and second shields define a vapor-trapping pathway that is configured and arranged to contain the flow of vapor out of the trap region and condense vapor along walls of the vapor-trapping pathway.

4. The apparatus of claim 3, wherein the vapor-trapping pathway is configured and arranged to pass condensed vapor into the trap region.

5. The apparatus of claim 1, wherein the first shield and eblock define a gap configured and arranged to permit the first shield as coupled to the outer surface of the shaft to rotate relative to the eblock, and wherein the first shield extends outward towards the inner surface of the eblock and is configured and arranged to impede the flow of vapor or lubricant from the trap region.

6. The apparatus of claim 1, wherein the shaft and second shield define another gap configured and arranged to permit the second shield as coupled to the inner surface of the eblock to rotate relative to the shaft, and wherein the second shield extends inwards towards the outer surface of the shaft and is configured and arranged to impede the flow of vapor or lubricant from the trap region.

7. The apparatus of claim 1, wherein the outer surface of the shaft, the inner surface of the eblock and the first and second shields define an elongated pathway configured and arranged to restrict a majority of the vapor flow from the trap region.

8. The apparatus of claim 1, wherein the eblock is configured and arranged to support a plurality of magnetoresistive elements for reading magnetically stored data on rotating media.

9. The apparatus of claim 1, wherein a gap between the first shield and the eblock is less than 0.010 inches, and another gap between the second shield and the shaft is less than 0.010 inches.

10. The apparatus of claim 3, wherein the vapor-trapping pathway is less than 0.020 inches wide.

11. The apparatus of claim 1, wherein the inner surface of the eblock is configured and arranged to condense vapor due to centrifugal force acting on the vapor caused by a rotation of the eblock, wherein the centrifugal force places some of the vapor into contact with the inner surface, whereby the condensed vapor on the inner surface accumulates in the trap region due to a gravitational force acting on the condensed vapor.

12. The apparatus of claim 1, wherein a top surface of the first shield is configured and arranged to condense and collect vapor in response to gravitational forces acting on the vapor.

13. The apparatus of claim 1, wherein the eblock has at least one magnetoresistive head configured and arranged to access data on a storage media.

14. A method comprising:
providing a vapor-trapping pathway between a pivot shaft and an eblock of a disc drive apparatus, the vapor-trapping pathway defined by
an outer surface of the pivot shaft,
an inner surface of the eblock,
a first shield extending from the outer surface of the pivot shaft toward the inner surface of the eblock, and
a second shield coupled to and extending from the inner surface of the eblock toward the outer surface of the pivot shaft;
operating the disc drive apparatus by causing the eblock to rotate around the pivot shaft, via a plurality of bearings; and
trapping vapor in the vapor-trapping pathway by passing vapor flow outwardly, relative to the pivot shaft.

15. The method of claim 14, wherein the step of trapping vapor further includes condensing vapor along walls of the vapor-trapping pathway.

16. The method of claim 14, wherein the step of trapping vapor further includes condensing vapor on the inner surface of the eblock of the vapor-trapping pathway utilizing centrifugal force, caused by a rotation of the eblock, whereby the vapor that contacts the inner surface of the eblock condenses and accumulates in a trap region due to a gravitational force.

17. The method of claim 14, wherein the step of trapping vapor further includes condensing vapor along a top surface of the first shield utilizing gravitational forces.

* * * * *